United States Patent [19]

Brouwer

[11] 4,022,016

[45] May 10, 1977

[54] GEAR DRIVE FOR AN INDICATING MECHANISM

[75] Inventor: Frans Brouwer, Glencoe, Ill.

[73] Assignee: Stewart-Warner Corporation, Chicago, Ill.

[22] Filed: Feb. 5, 1976

[21] Appl. No.: 655,534

[52] U.S. Cl. .................................. 58/125 C; 58/2; 58/23 D; 235/1 C; 235/95 R

[51] Int. Cl.[2] .................... G04C 3/00; G04B 19/02; G01C 22/00

[58] Field of Search .............. 58/2, 8, 23 D, 125 C, 58/125 R, 126 E; 235/1 C, 95 R

[56] References Cited

UNITED STATES PATENTS

| | | | |
|---|---|---|---|
| 2,036,050 | 3/1936 | Kenerson | 58/125 R |
| 2,157,540 | 5/1939 | Horwitt | 58/125 C |
| 3,899,872 | 8/1975 | Flumm et al. | 58/125 C |

*Primary Examiner*—E. S. Jackmon

[57] ABSTRACT

A simplified gear drive mechanism for an indicating device such as a clock. The output shaft of the indicator's drive motor carries an eccentric which orbits a multiple gear tooth orbiting gear. One gear on the orbiting gear engages a stationary ring gear having a different number of teeth while another gear on the orbiting gear engages an output ring gear having a different number of teeth. This output ring gear may, for example, be employed to drive the minute hand of a clock. To provide multiple indicators such as required in a clock, a second orbital gear train is provided having an eccentric on the output gear of the first gear train for the purpose of orbiting an orbiting gear in the second gear train. An output ring gear in the second orbiting gear train is employed to drive the hour hand of the clock. In another embodiment of the present invention, a similar orbiting gearing arrangement is employed for driving a digital indicator, such as a digital clock.

19 Claims, 21 Drawing Figures

GEAR DRIVE FOR AN INDICATING MECHANISM

BACKGROUND OF THE PRESENT INVENTION

The present invention relates generally to drives for indicating devices such as clock mechanisms. The usual type of clock mechanism employs multiple spur gear trains which are hard to assemble and which in high volume production require extremely expensive tooling for automatic assembly. Still other types of gear trains have been devised for clock mechanisms, but these have certain gear meshing problems that render them undesirable.

SUMMARY OF THE PRESENT INVENTION

According to the present invention, an indicating device drive mechanism, such as for a clock, is provided that includes single or multiple orbital gear assemblies that are extremely easy to assemble with normal assembly tools or even by hand. The clock is driven by a step motor with the second hand placed directly on the shaft of the step motor which rotates one time per minute, peferably at 60 1-second steps. A first orbital gear assembly provides the 60 to 1 ratio from the second hand to the minute hand. In this orbital gear train assembly, an output ring gear is provided that has a different number of teeth than one of the gears of the orbiting gear unit. A second orbiting gear assembly provides the 12 to 1 ratio from the minute hand to the hour hand.

For the purpose of resetting the clock, reset gearing is provided that is selectively positionable so that is can rotate normally stationary ring gears in either the minute hand orbital gear train or the hour hand orbital gear train. A detent mechanism is provided associated with the normally stationary ring gear in the hour orbital gear train so that the hour hand may be reset one hour at a time with a snap action eliminating the possibility of placing the minute hand in the wrong position when going from one time zone to another.

In another embodiment of the present invention, a digital indicating device or clock is provided, also employing an orbital gear train. The step motor in this embodiment is positioned within the digital dials for the clock providing an extremely compact unit.

DETAILED DESCRIPTION OF THE PREFERRED EMBODIMENTS

Figure 1:
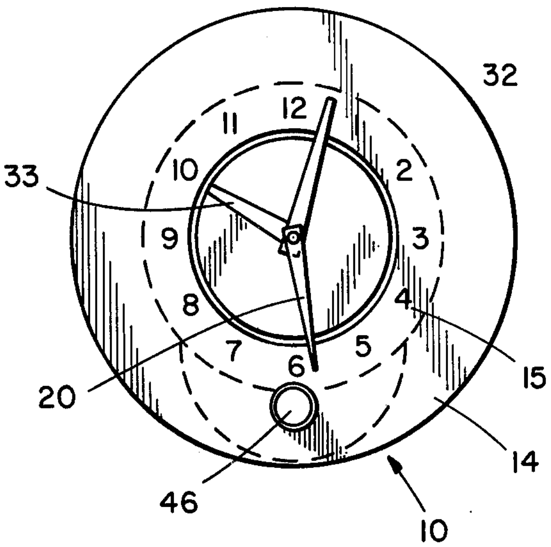
FIG. 1 is a front view of the clock assembly according to the present invention.
Figure 2:
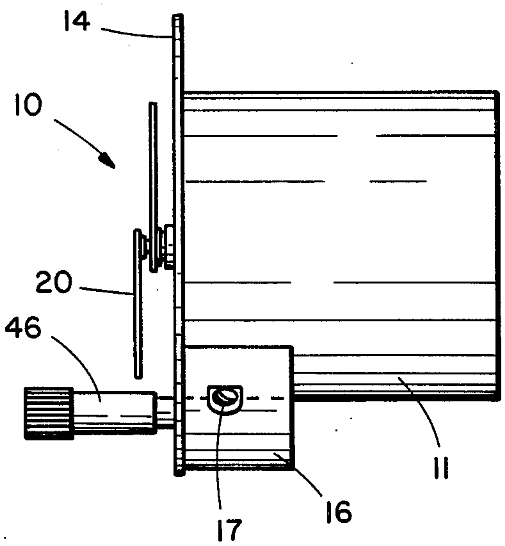
FIG. 2 is a side view of the clock assembly shown in FIG. 1.

Referring to the drawings and particularly FIGS. 1 to 8, an analogue clock mechanism according to the present invention is illustrated. The clock 10 includes a cylindrical housing 11 having a step motor 12 positioned therein for driving the clock mechanism. A dial 14 is fixed to the front of the housing 11 having indicia 15 indicating the hours and minutes.

An arcuate secondary housing 16 is fixed by fasteners 17 to the lower portion of housing 11, and housing 16 houses a reset mechanism which will appear more clearly herein below.

Figure 3:
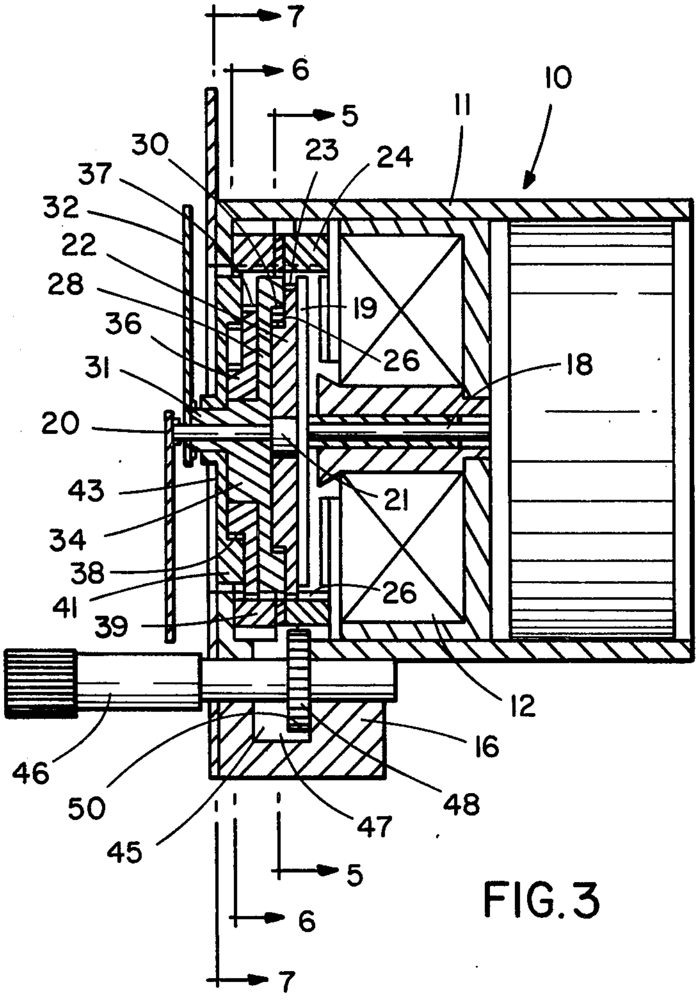
FIG. 3 is an enlarged longitudinal section of the clock shown in FIGS. 1 and 2.
Figure 4:
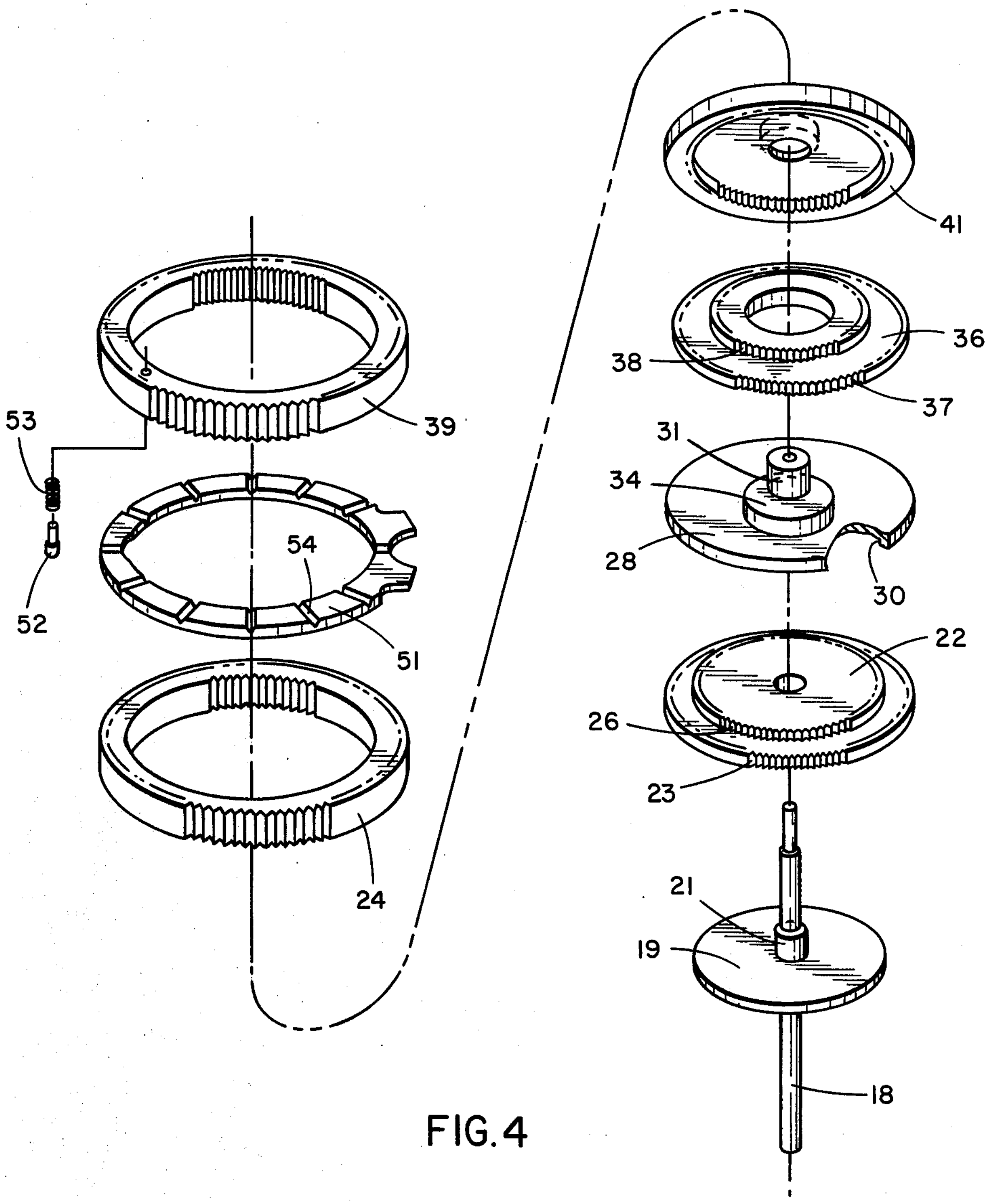
FIG. 4 is an exploded view of the gearing in the clock shown in FIGS. 1 to 3.
Figure 5:
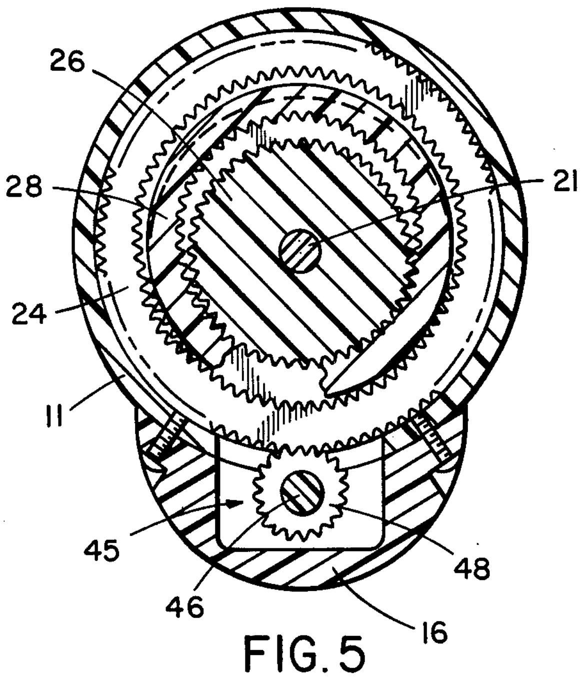
FIG. 5 is a cross-section taken generally along line 5—5 of FIG. 3.
Figure 6:
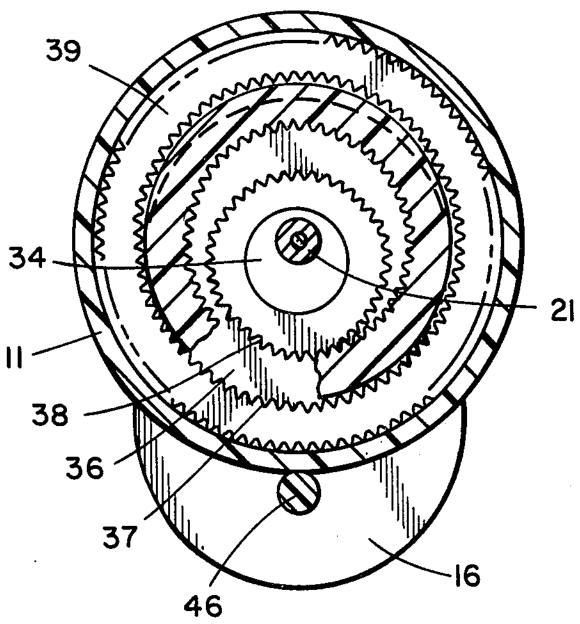
FIG. 6 is a cross-section taken generally along line 6—6 of FIG. 3.
Figure 7:
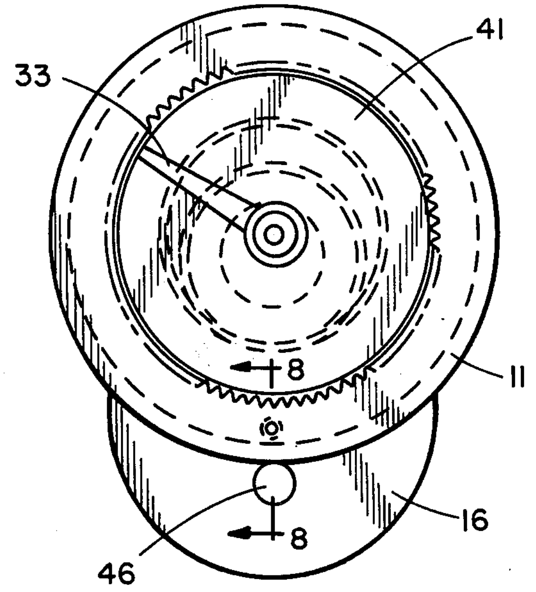
FIG. 7 is a cross-section taken generally along line 7—7 of FIG. 1.
Figure 8:
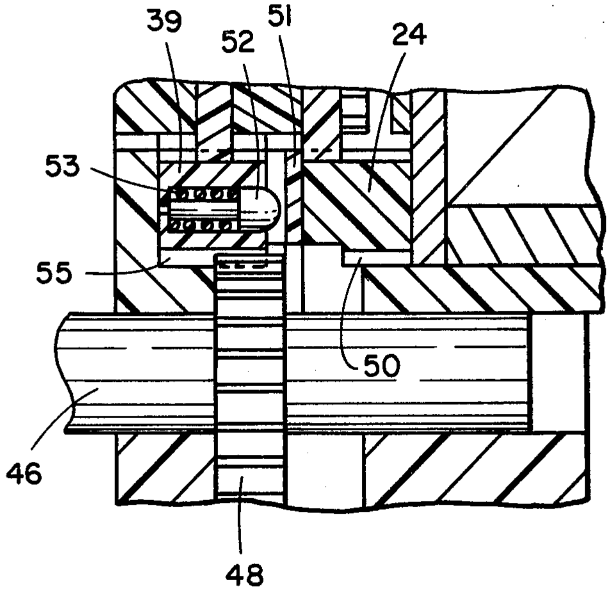
FIG. 8 is an enlarged fragmentary view of the reset mechanism of the clock of FIGS. 1 to 3.
Figure 9:
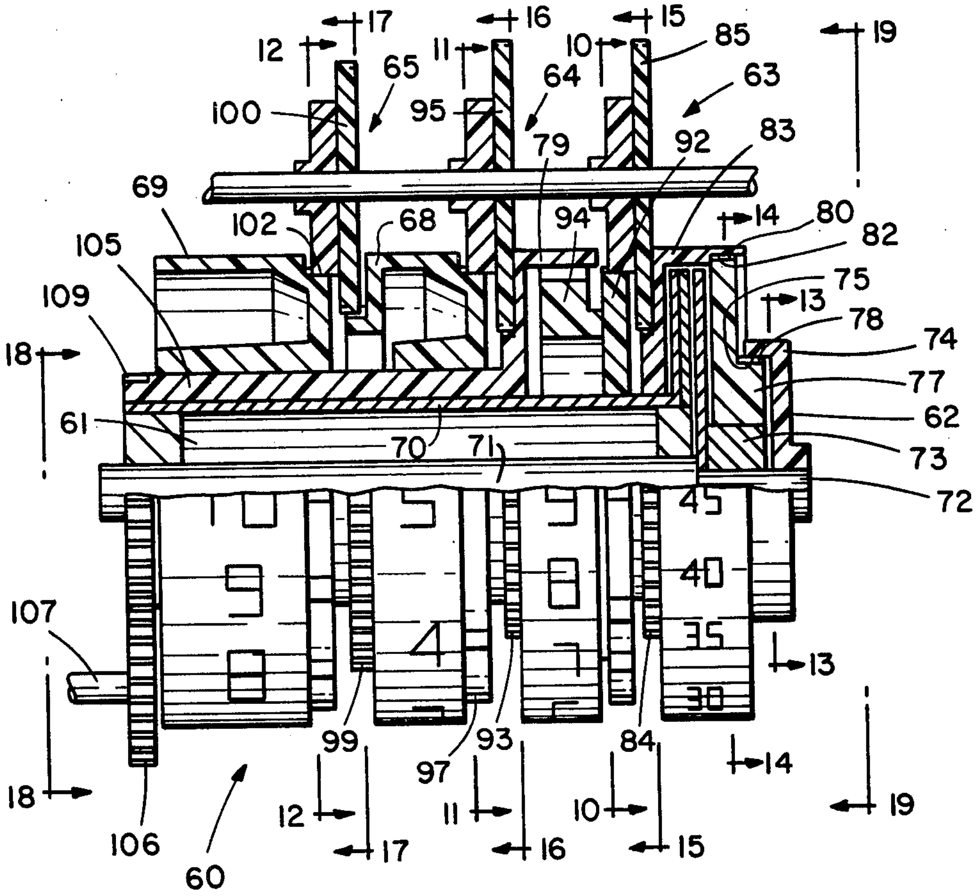
FIG. 9 is a longitudinal section of a digital clock according to another embodiment of the present invention.
Figure 10:
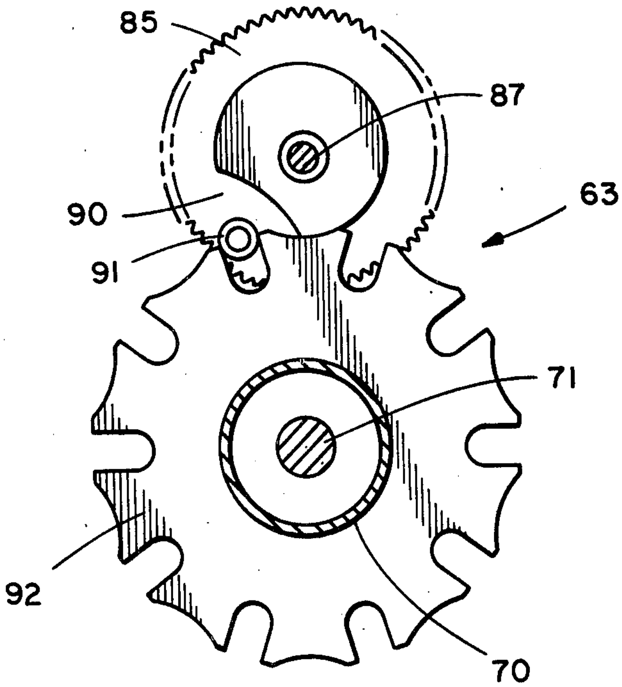
FIG. 10 is a cross-section taken generally along line 10—10 of FIG. 9.

The step motor 12 has a motor shaft 18 permanently carrying a cylindrical rotor 19 shown clearly in FIGS. 3 and 4.

The motor shaft 18 directly drives a second hand 20 and the motor 12 rotates at one revolution per minute.

Integral with the motor shaft 18 is an eccentric 21. An orbiting gear member 22 is rotatably mounted on the eccentric 21 and driven in orbital movement thereby. The orbiting gear 22 has a first set of gear teeth 23 which have orbital engagement with a normally stationary ring gear 24. As the motor shaft 18 rotates, the engagement between teeth 23 and teeth 26 on ring gear 24 causes the orbital and rotational movement of the orbiting gear member 22.

It should be understood that the number of teeth on gear 23 and gear 24 are different to cause the rotation of the orbiting member 22. Integral with the orbiting member 22 is a second gear 26 which of course orbits with the gear member 22. The teeth on gear 26 have engagement with an output ring gear 28. The ring gear 28 has teeth 30. It should be understood that the number of teeth on gear 26 is different from tne number of teeth 30, thus causing relative rotation between the orbiting gear member 22 and the output ring gear 28.

The output ring gear 28 has a projection 31 to which a minute hand 32 is fixed.

This orbital gear train provides the necessary 60 to 1 ratio between drive shaft 18 and the output ring gear 28. The gear ratios in the orbital gear trains are defined by $$R = 1 - \frac{N_2 N_3}{N_1 N_4}$$

where $N_1$ equals the number of teeth on the output ring gear 30, $N_2$ equals the number of teeth on the orbital gear 26, $N_3$ equals the number of teeth on the stationary ring gear 24, and $N_4$ equals the number of teeth on orbiting gear 23. For the proper meshing, and with identical teeth in all four gears, it is desirable that $N_1$–$N_2$ is substantially equal, or at least not more than a few teeth different from $N_3$–$N_4$.

A second orbital gear train is provided for driving the hour indicator 33 shown in FIG. 1. Toward this end, an eccentric 34 is formed integrally with the output ring gear 28. Rotatably mounted on this eccentric 34 is another orbiting gear member 36. Orbiting gear member 36 has a large integral gear 37 having orbital engagement with another normally stationary ring gear 39. The engagement between gear teeth 37 and the normally stationary gear 39 causes orbital movement of the second orbiting member 36. A second smaller gear 38 is integrally formed with orbiting member 36 and has orbital and rotational engagement with respect to a second output ring gear 41. The gear ratio of this second orbital gear train provides a 12 to 1 gear ratio in accordance with the above formula to drive hour indicator 33 which may be formed directly on the front face 43 of the second output ring gear 41.

For the purpose of resetting clock 10, a reset mechanism 45 is provided. The reset mechanism 45 includes a reset shaft 46 axially slidable in housing interior 47. Shaft 46 carries a spur gear 48. The gear 48 is engageable with gear teeth 50 so that upon rotation of shaft 46 the normally stationary ring gear 24 will rotate and the minute hand orbital gearing will reset the clock indicators.

A further feature of the present invention is that the reset mechanism 45 can also operate to reset the clock in one hour increments, thereby preventing any missetting of the clock which might occur when resetting through the minute hand gearing. Toward this end, an annular ring 51 is provided having 11 recesses 54. Ring 51 is positioned between the ring gears 24 and 39. A detent plunger 52 is slidable in an aperture in ring gear 39 and is biased outwardly by spring 53 so that it may be received in one of the slots 54. Thus, when shaft 46 is pulled outwardly providing engagement between gear 48 and teeth 50 on ring gear 39, the ring gear 39 is rotated 1/11 of a revolution until detent plunger 52 falls into another slot, thereby providing one hour resets for the clock mechanism.

During assembly, the ring gears 24 and 39 are placed in housing 11. Thereafter, motor 12 is inserted into the rear end of the housing holding the normally stationary ring gears in position. Thereafter, motor shaft 18 along with rotor 19 and eccentric 21 are inserted into the assembly from the open end. Thereafter, orbiting gear member 22 is placed on eccentric 21, output ring gear 28 is stacked on the left end of motor shaft 18, the orbiting gear member 36 is placed on eccentric 34, and the output ring gear 41 is positioned on concentric projection 31. Thereafter, the hands for the indicators are placed on the projection 31 and shaft 18. Note that the second hand serves to hold the gearing in the proper position.

Referring to FIGS. 9 to 19 a further embodiment of the present invention is illustrated, taking the form of a digital clock 60. The digital clock 60 consists basically of a step motor 61, orbital drive gearing 62, geneva mechanisms 63, 64 and 65 driving digital indicator wheels 67, 68 and 69.

An important aspect of this invention is that the step motor 61 is positioned within the dials 67, 68 and 69 providing a very compact clock assembly. The step motor 61 is positioned within a cylindrical housing 70. The Motor 61 has a stationary motor shaft 71 with a reduced projecting portion 72. As part of the orbital gearing 62, an eccentric 73 is fixed to the rotor X, which can rotate freely around the reduced shaft portion 72. A stationary ring gear 74 is fixed to the end of shaft portion 72 and has concentric gear teeth 75. Rotatable on and driven in orbit by eccentric 73 is an orbiting gear member 77. The orbiting gear member has a small integral gear 78 engageable with ring gear teeth 75 for the purpose of driving the same in rotational movement. Also formed integrally with orbiting member 77 is a large gear 80 having teeth 81 in driving engagement with ring gear 82. Because of the rotational movement of orbiting member 77, and the difference in the number of teeth between gear 80 and ring gear 82, the ring gear 82 rotates. Ring gear 82 is formed integrally with a cylindrical member 83 that may carry indicia corresponding to the seconds.

Figure 15:
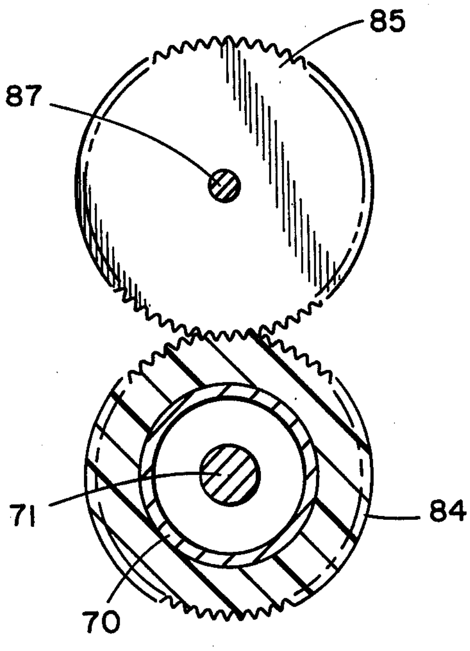
FIG. 15 is a cross-section taken generally along line 15—15 of FIG. 9.

The cylindrical member 83 is formed integrally with a gear 84 shown clearly in FIG. 15. Gear 84 meshes with a gear 85 rotatably mounted on countershaft 87. Fixed to gear 85 is a geneva driver 90 having a pin 91 in driving engagement with a driven geneva wheel 92X rotatably mounted on housing 70. The geneva mechanism 63 provides the proper drive ratio between the second wheel 83 and the minute wheel 67 through a clutch mechanism 94.

Figure 11:
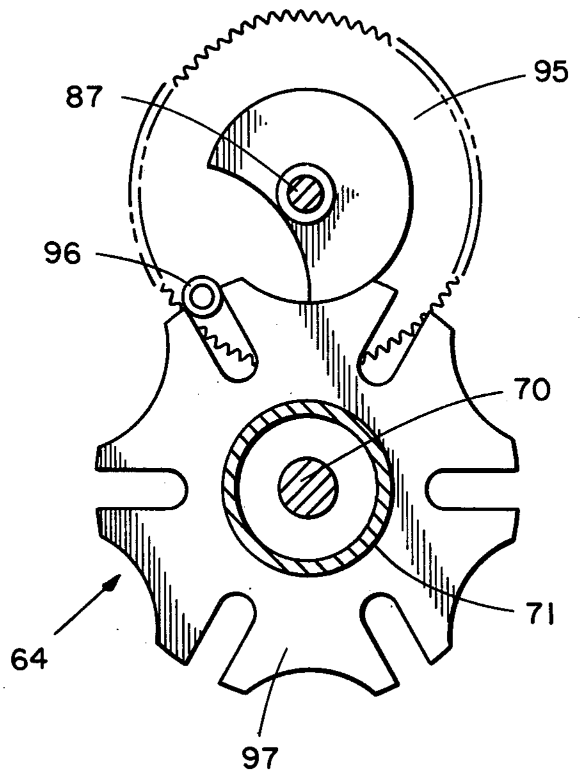
FIG. 11 is a cross-section taken generally along line 11—11 of FIG. 9.
Figure 12:
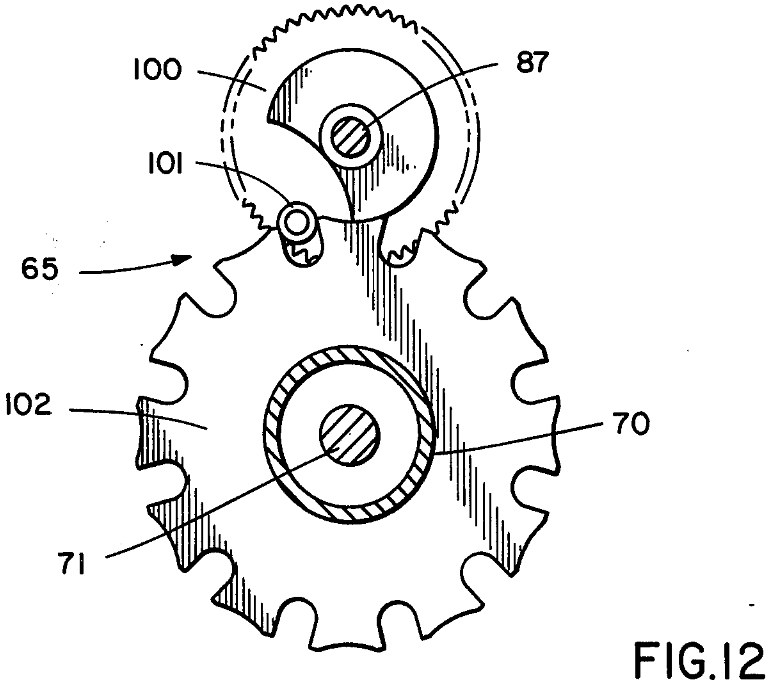
FIG. 12 is a cross-section taken generally along line 12—12 of FIG. 9.
Figure 13:
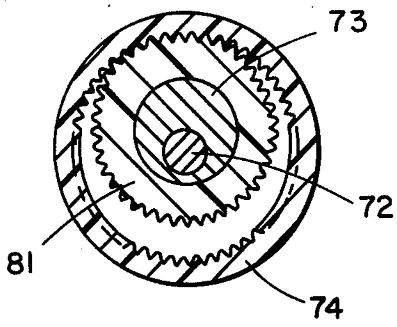
FIG. 13 is a cross-section taken generally along line 13—13 of FIG. 9.
Figure 14:
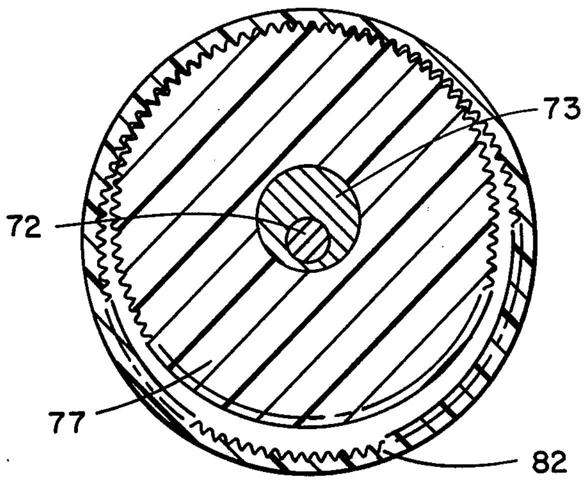
FIG. 14 is a cross-section taken generally along line 14—14 of FIG. 9.
Figure 16:
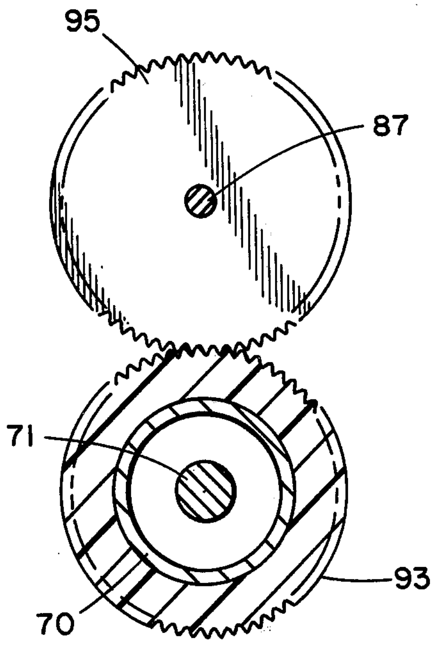
FIG. 16 is a cross-section taken generally along line 16—16 of FIG. 9.
Figure 17:
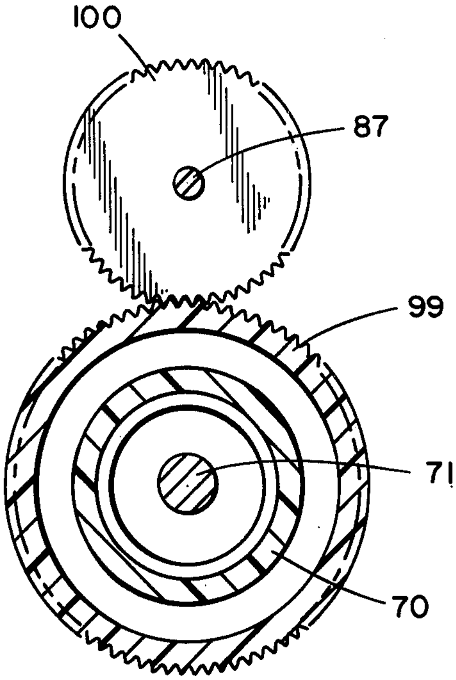
FIG. 17 is a cross-section taken generally along line 17—17 of FIG. 9.
Figure 18:
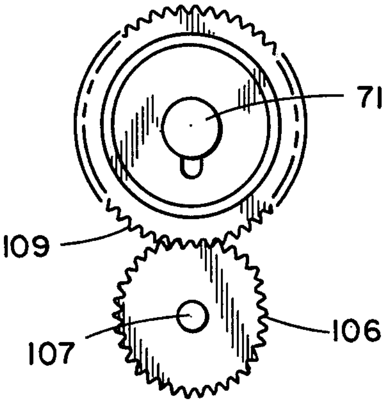
FIG. 18 is an end view taken generally along line 18—18 of FIG. 9.
Figure 19:
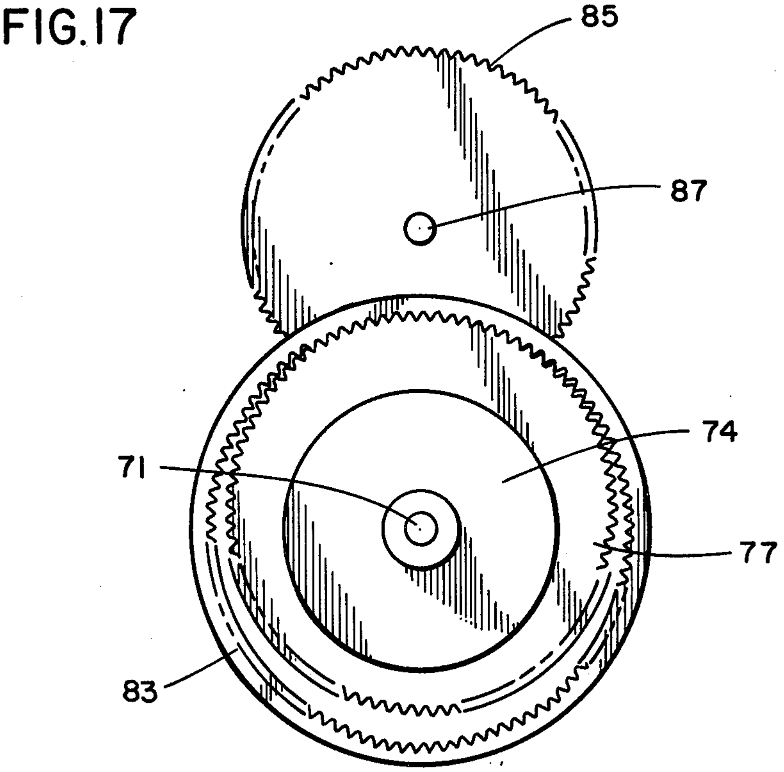
FIG. 19 is an opposite end view taken generally along line 19—19 of FIG. 9.

Minute wheel 67 has formed integrally therewith a gear 93 which engages gear 95 rotatably mounted on countershaft 87 and defining a portion of the geneva mechanism 64 as shown in FIG. 16. The geneva mechanism 64 is illustrated in FIG. 11 and includes gear 95 which defines the driver including pin 96 engageable in slots in the driven geneva wheel 97 formed integrally with the 0 to 15 units dial 68, providing a drive ratio of between the minute wheel 67 and the tens wheel 68 of 6 to 1 as shown in FIG. 11.

Dial 68 has integrally formed therewith a gear 99 engaging a gear 100 and countershaft 87 defining a portion of the geneva mechanism 65. The geneva driver includes a pin 101 engageable in slots in the driven geneva wheel 102 formed integrally with the hour dial 69. The twelve slots in the wheel 102 provide the 12 to 1 ratio between the tens dial 68 and the hour dial 69.

For the purpose of resetting clock 60, a sleeve 105 extends axially around the housing 70 and is formed integrally with minute wheel 67. Sleeve 105 is rotated by reset gear 106 driven by reset shaft 107. Gear 106 engages a gear 109 formed integrally on sleeve 105.

Figure 20:
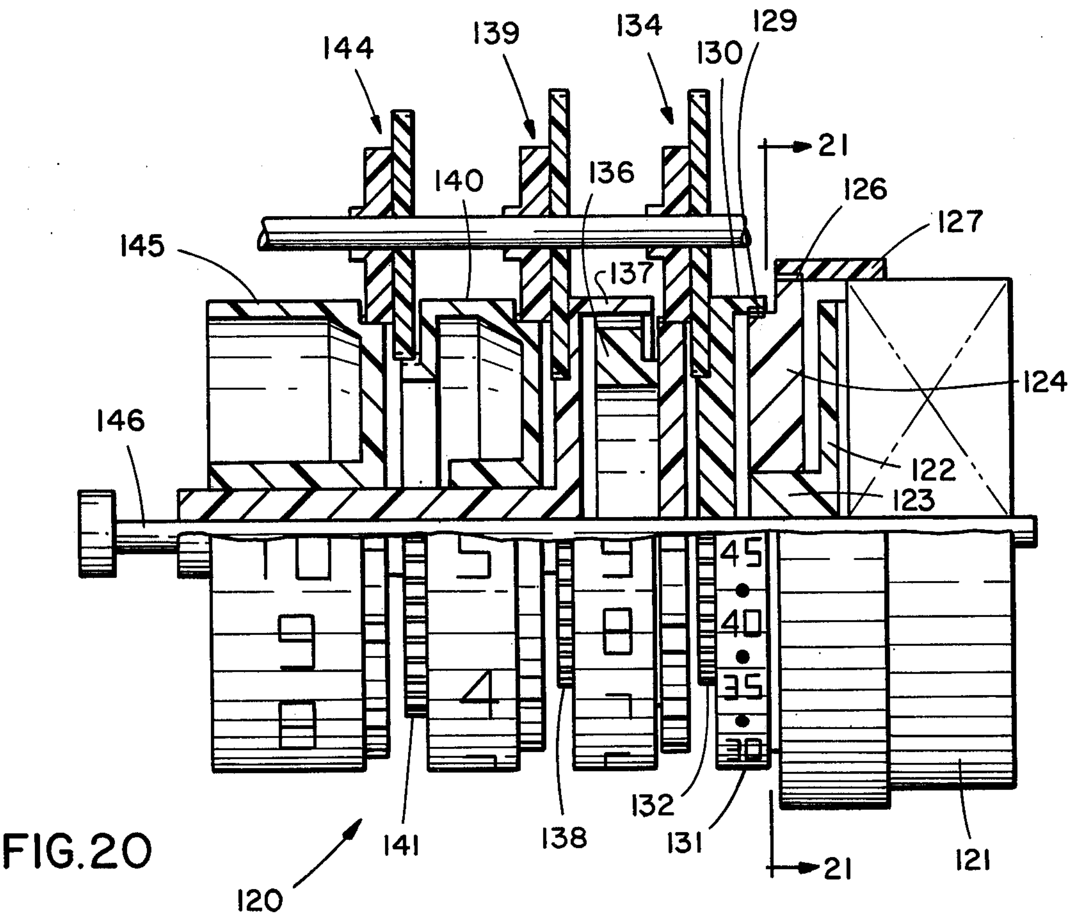
FIG. 20 is a digital clock according to still another embodiment of the present invention.
Figure 21:
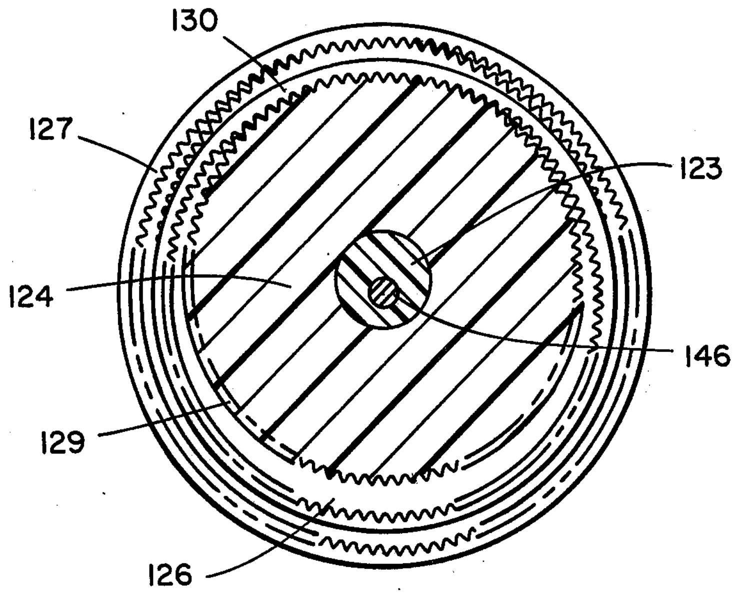
FIG. 21 is a cross-section taken generally along line 21—21 of FIG. 20.

A further embodiment of the present invention is illustrated in FIGS. 20 and 21, generally similar to the embodiments of FIGS. 9 to 19 except the step motor is externally disposed wth respect to the digit dials.

As seen in FIG. 20, a digital clock 120 is provided including a step motor 121 having a rotor 12. The rotor 122 is formed integrally with an eccentric 123 which rotatably carries and drives an orbiting gear member 124. Gear 124 has a first gear 126 engaging a stationary ring gear 127 for the purpose of providing orbital and rotational movement of the orbiting member 124. Also formed integrally with orbiting member 124 is a smaller gear 129 engaging a ring gear 130 having a cylindrical portion 131 which may carry indicia corresponding to the seconds. Gear 132 integrally formed with ring gear 130 drives the geneva mechanism 134 which through clutch 136 drives a tens dial 137. Gear 138 formed integrally with minute dial 137 drives a geneva mechanism 139. Geneva mechanism 139 drives the tens or 0 to 5 dial 140. Formed integrally on the tens dial 140 is a gear 141 driving a geneva mechanism 144, which in turn drives an hour dial 145. Motor shaft 146 does not provide any driving function in this embodiment.

What is claimed is:

1. A motor driven indicating assembly, comprising; housing means, motor means in said housing means, a motor shaft, an eccentric carried by said motor shaft, orbital gearing driven by said eccentric, said orbital gearing including a first gear and a second gear, a stationary ring gear, said first orbital gear engaging said stationary ring gear, an output ring gear, said second orbital gear engaging said output ring gear, indicator means driven by said output ring gear, the number of teeth on the stationary ring gear being different than the number of teeth of the first orbital gear, and the number of teeth on the output ring gear being different than the number of teeth on the second orbital gear.

2. A motor driven indicating assembly as defined in claim 1, where the second orbital gear is smaller in diameter than the first orbital gear.

3. A motor driven indicating assembly, comprising; housing means, motor means in said housing means, a motor shaft, an eccentric, carried by said motor shaft, orbital gearing driven by said eccentric, said orbital gearing including a first gear and a second gear, a stationary ring gear, said first orbital gear engaging said stationary ring gear, an output ring gear, said second orbital gear engaging said output ring gear, indicator means driven by said output ring gear, the number of teeth on the stationary ring gear being different than the number of teeth of the first orbital gear, the number of teeth on the output ring gear being different than the number of teeth on the second orbital gear, wherein the gear ratio on the gears is defined by the formula $$R = 1 - \frac{N_2 N_3}{N_1 N_4}$$

where $N_1$ equals the number of teeth on the output ring gear; $N_2$ equals the number of teeth on the second orbital gear; $N_3$ equals the number of teeth on the stationary ring gear; $N_4$ equals the number of teeth on the first orbital gear; and $N_1 - N_2$ is substantially equal to $N_3 - N_4$.

4. A clock assembly comprising; housing means, motor means in said housing means, a drive shaft driven by said motor means, two sets of orbital gear assemblies being centrally arranged on said drive shaft, said first gear assembly including an eccentric on said shaft, orbital gearing on said eccentric, said orbital gearing having a first orbital gear, a stationary ring gear, said first orbital gear engaging said stationary ring gear, an output ring gear driven by said second orbital gear, first clock indicating means driven by said output ring gear, said second orbital assembly including an eccentric, orbital gearing driven by said eccentric, said second orbital gearing including first and second gears, a stationary ring gear in driving engagement with said first gear, an output ring gear being driven by said second orbital gear, second clock indicating means being driven by said second output ring gear, and gear means engageable with both of said stationary ring gears to reset each of said clock indicating means.

5. A clock assembly as defined in claim 4, wherein said reset gear means includes an axial slidable single gear.

6. A clock assembly as defined in claim 5, wherein said single reset gear is selectively engageable with each of said stationary ring gears, said stationary ring gears having external teeth engageable with said single reset gear.

7. A clock assembly as defined in claim 4, including a detent mechanism for one of said stationary ring gears so that it is reset in steps.

8. A clock assembly as defined in claim 7, wherein said one ring gear is in the orbital gear assembly controlling the hour indicating means.

9. A digital indicating device, comprising; cylindrical housing means, a motor in said housing having a motor shaft, orbital gearing driven by said motor shaft, a plurality of wheels having digital indicating means surrounding said housing means, and means drivingly interconnecting said orbital gearing and said digit wheels.

10. A digital indicating device as claimed in claim 9, wherein said orbital gearing includes an eccentric carried by said motor shaft, an input ring gear fixed adjacent the end of the motor shaft, an orbital gear combination rotatably mounted on said eccentric having a first gear engaging said input ring gear, an output ring gear, said orbital gear combination having a second gear drivingly engaging said output ring, said output ring gear being drivingly connected to said digit wheels.

11. A digital indicating device as claimed in claim 9, including driving means providing the desired drive ratio between the digit wheels.

12. A digital indicating device as claimed in claim 11, wherein said driving means for said digit wheels includes a plurality of geneva mechanisms.

13. A digital indicating device, comprising; cylindrical housing means, a motor in said housing having a motor shaft, orbital gearing driven by said motor shaft, a plurality of wheels having digital indicating means surrounding said housing means, means drivingly interconnecting said orbital gearing and said digit wheels, said orbital gearing including an eccentric carried by said motor shaft, an input ring gear fixed adjacent the end of the motor shaft, an orbital gear combination rotatably mounted on said eccentric having a first gear engaging said input ring gear, an output ring gear, said orbital gear having a second gear drivingly engaging said output ring, said output ring gear being drivingly connected to said adjacent wheels, driving means providing the desired drive rotor between the digit wheels, said driving means for said digit wheels including a plurality of geneva mechanisms.

14. A digital indicating device as claimed in claim 9, including a sleeve around said housing fixed to one of said digit wheels, gear means on the end of said sleeve, and reset gear means engaging said gear means for resetting said digital indicating device,

15. A digital indicating device, comprising; cylindrical housing means, a motor in said housing having a motor shaft, orbital gearing driven by said motor shaft, a plurality of wheels having digital indicating means surrounding said housing means, means drivingly interconnecting said orbital gearing and said digit wheels, said orbital gearing including an eccentric carried by said motor shaft, an input ring gear fixed adjacent the end of the motor shaft, an orbital gear rotatably mounted on said eccentric having a first gear engaging said input ring gear, an output ring gear, said orbital gear combination having a second gear drivingly engaging said output ring, said output ring gear being drivingly connected to said digit wheels, including driving means providing the desired drive ratio between the digit wheels.

16. A digital indicating device, comprising; cylindrical housing means, a motor in said housing having a motor shaft, orbital gearing driven by said motor shaft, a plurality of wheels having digital indicating means surrounding said housing means, and means drivingly interconnecting said orbital gearing and said digit wheels, said orbital gearing including an eccentric carried by said motor shaft, an input ring gear fixed adjacent the end of the motor shaft, an orbital gear rotatably mounted on said eccentric having a first gear engaging said input ring gear, an output ring gear, said orbital gear combination having a second gear drivingly engaging said output ring, said output ring gear being drivingly connected to said digit wheels, and said driving means for said digit wheels includes a plurality of geneva mechanisms.

17. A digital indicating device, comprising; cylindrical housing means, a motor in said housing means having a motor shaft, orbital gearing driven by said motor shaft, a plurality of wheels having digital indicating means surrounding said housing means, means drivingly interconnecting said orbital gearing and said digit wheels, said orbital gearing including an eccentric carried by said motor shaft, an input ring gear fixed adjacent the end of the motor shaft, an orbital gear combination rotatably mounted on said eccentric having a first gear engaging said input ring gear, an output ring gear, said orbital gearing having a second gear drivingly engaging said output ring gear, said output ring gear being drivingly connected to said digital wheels, a sleeve around said housing fixed to one of said digit wheels, gear means on the end of said sleeve, and reset gear means engaging said gear means for resetting said digital indicating device.

18. A digital indicating device, comprising; cylindrical housing means, a motor in said housing having a motor shaft, orbital gearing driven by said motor shaft, a plurality of wheels having digital indicating means surrounding said housing means, and means drivingly interconnecting said orbital gearing and said digit wheels, said orbital gearing including an eccentric carried by said motor shaft, an input ring gear fixed adjacent the end of the motor shaft, an orbital gear rotatably mounted on said eccentric having a first gear engaging said input ring gear, an output ring gear, said orbital gear having a second gear drivingly engaging said output ring, said output ring gear being drivingly connected to said digital wheels, driving means providing the desired drive ratio between the digit wheels, said driving means for said digit wheels including a plurality of geneva mechanisms, a sleeve around said housing fixed to one of said digit wheels, gear means on the end of said sleeve, and reset gear means engaging said gear means for resetting said digital indicating device.

19. A digital indicating device, comprising; motor means, an orbital gear assembly including an eccentric, said motor means driving said eccentric, orbital gearing including a first gear, a stationary ring gear adjacent said motor means engaging said first gear, an output ring gear, said orbital gearing having a second gear engaging said output ring gear, and a plurality of digital indicating wheels driven by said output ring gear.

* * * * *